(12) United States Patent
Cain et al.

(10) Patent No.: US 11,476,463 B2
(45) Date of Patent: Oct. 18, 2022

(54) FLASH CARBON COATING ON ACTIVE SURFACES, METHODS OF MANUFACTURE THEREOF AND ARTICLES COMPRISING THE SAME

(71) Applicant: GM Global Technology Operations LLC, Detroit, MI (US)

(72) Inventors: Jeffrey D. Cain, Royal Oak, MI (US); Thomas E. Moylan, Troy, MI (US); Andrew C. Bobel, Troy, MI (US); Lei Wang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 126 days.

(21) Appl. No.: 16/987,597

(22) Filed: Aug. 7, 2020

(65) Prior Publication Data

US 2022/0045326 A1 Feb. 10, 2022

(51) Int. Cl.
*H01M 4/04* (2006.01)
*H01M 4/583* (2010.01)
*C01B 32/205* (2017.01)
*H01G 9/00* (2006.01)
*H01M 4/36* (2006.01)

(52) U.S. Cl.
CPC .......... *H01M 4/583* (2013.01); *C01B 32/205* (2017.08); *H01G 9/0029* (2013.01); *H01M 4/0404* (2013.01); *H01M 4/366* (2013.01); *C01P 2006/40* (2013.01)

(58) Field of Classification Search
CPC .................................................. C01B 32/205
See application file for complete search history.

(56) References Cited

U.S. PATENT DOCUMENTS

| | | |
|---|---|---|
| 8,859,144 B2 | 10/2014 | Xiao |
| 9,005,811 B2 | 4/2015 | Xiao et al. |
| 9,093,705 B2 | 7/2015 | Xiao et al. |
| 9,142,830 B2 | 9/2015 | Xiao et al. |
| 9,302,914 B2 | 4/2016 | Liu et al. |
| 9,577,251 B2 | 2/2017 | Xiao et al. |
| 9,780,361 B2 | 10/2017 | Xiao et al. |
| 10,062,898 B2 | 8/2018 | Xiao |
| 2021/0206642 A1* | 7/2021 | Tour ...................... C01B 32/192 |
| 2022/0052323 A1* | 2/2022 | Mangolini ............... C01B 33/02 |

* cited by examiner

*Primary Examiner* — Austin Murata
(74) *Attorney, Agent, or Firm* — Cantor Colburn LLP

(57) ABSTRACT

Disclosed herein is a method comprising mixing an electroactive particle with a carbonaceous material to form a particle mixture that comprises a carbon coated particle; subjecting the carbon coated particle to a pulsed voltage between parallel plate electrodes or between rolls of a roll mill; and converting the carbon coated particle to a graphite coated particle via localized Joule heating. Disclosed herein too is an apparatus comprising a mixing device that is operative to mix an electroactive particle with a carbonaceous material to form a particle mixture that comprises a carbon coated particle; and a device for applying a pulsed voltage to the particle mixture; where the applying of the pulsed voltage is conducted when the particle mixture is located between opposing plate electrodes or between opposing rolls of a roll mill; where the device for applying the pulsed voltage converts the carbon coated particle into a graphite coated particle.

13 Claims, 5 Drawing Sheets

FLASH CARBON COATING ON ACTIVE SURFACES, METHODS OF MANUFACTURE THEREOF AND ARTICLES COMPRISING THE SAME

BACKGROUND

This disclosure is related to flash carbon coating of active surfaces, methods of manufacture thereof and to articles comprising the same. In particular, this disclosure is related to the graphitic coating of active surfaces, methods of manufacture thereof and to articles comprising the same.

The conformal coating of electroactive particles with graphitic carbon has been demonstrated to increase cell (e.g., batteries and capacitors) durability and capacity retention in certain types of anodes. Carbon coating (in the form of graphite) is presently accomplished through a chemical vapor deposition (CVD) process in which an organic precursor is reacted at high temperature and deposited onto the surface of the electroactive particles.

These currently used methods however are time consuming, use high temperatures (greater than 1500° C.), use flammable precursors (which are not always environmentally friendly) and have issues with scalability. The high temperatures used in the CVD process sometimes damage the electroactive particles.

Accordingly, it is therefore desirable to develop a new technology that uses a shorter duration for higher throughput, safer precursors, and greater potential for scalability.

SUMMARY

In one exemplary embodiment, a method comprises mixing an electroactive particle with a carbonaceous material to form a particle mixture that comprises a carbon coated particle. The carbon coated particle is subjected to a pulsed voltage between parallel plate electrodes or between rolls of a roll mill. The carbon coated particle is converted to a graphite coated particle via localized Joule heating.

In another exemplary embodiment, the pulsed voltage is 10 to 200 volts.

In yet another exemplary embodiment, the pulsed voltage has a pulse duration of 5 to 50 milliseconds.

In yet another exemplary embodiment, the particle mixture further comprises a solvent.

In yet another exemplary embodiment, the parallel plate electrodes comprise a refractory material.

In yet another exemplary embodiment, the refractive material is copper, graphite or tungsten.

In yet another exemplary embodiment, the graphite coated particle comprises an amorphous layer and a graphite layer.

In yet another exemplary embodiment, the amorphous layer is disposed between the electroactive substrate and the graphite layer.

In yet another exemplary embodiment, the graphite coated particle comprises only a graphite layer disposed on the electroactive substrate.

In yet another exemplary embodiment, the particle mixture is transported while applying the pulsed voltage to the particle mixture.

In yet another exemplary embodiment, the particle mixture is discharged from a mixing device to the parallel plate electrode.

In yet another exemplary embodiment, the particle mixture is discharged from a mixing device to a moving sheet.

In yet another exemplary embodiment, the moving sheet is a current collector.

In an embodiment, an apparatus comprises a mixing device that is operative to mix an electroactive particle with a carbonaceous material to form a particle mixture that comprises a carbon coated particle. A device for applying a pulsed voltage to the particle mixture is located downstream of the mixing device. The applying of the pulsed voltage is conducted when the particle mixture is located between opposing plate electrodes or between opposing rolls of a roll mill. The device for applying the pulsed voltage converts the carbon coated particle into a graphite coated particle.

In another embodiment, the parallel plate electrodes are disposed on opposing sides of a conduit through which the particle mixture is transported.

In another exemplary embodiment, the particle mixture is in motion when the carbon coated particle is converted to a graphite coated particle.

In another exemplary embodiment, the pulsed voltage is applied via the opposing rolls of the roll mill.

In another exemplary embodiment, the apparatus comprises a pair of spools onto which a current collector sheet is unwound and wound and wherein the particle mixture is disposed onto the current collector.

In another exemplary embodiment, the pulsed voltage is between 10 and 200 volts applied for a pulse duration of 5 to 50 milliseconds.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
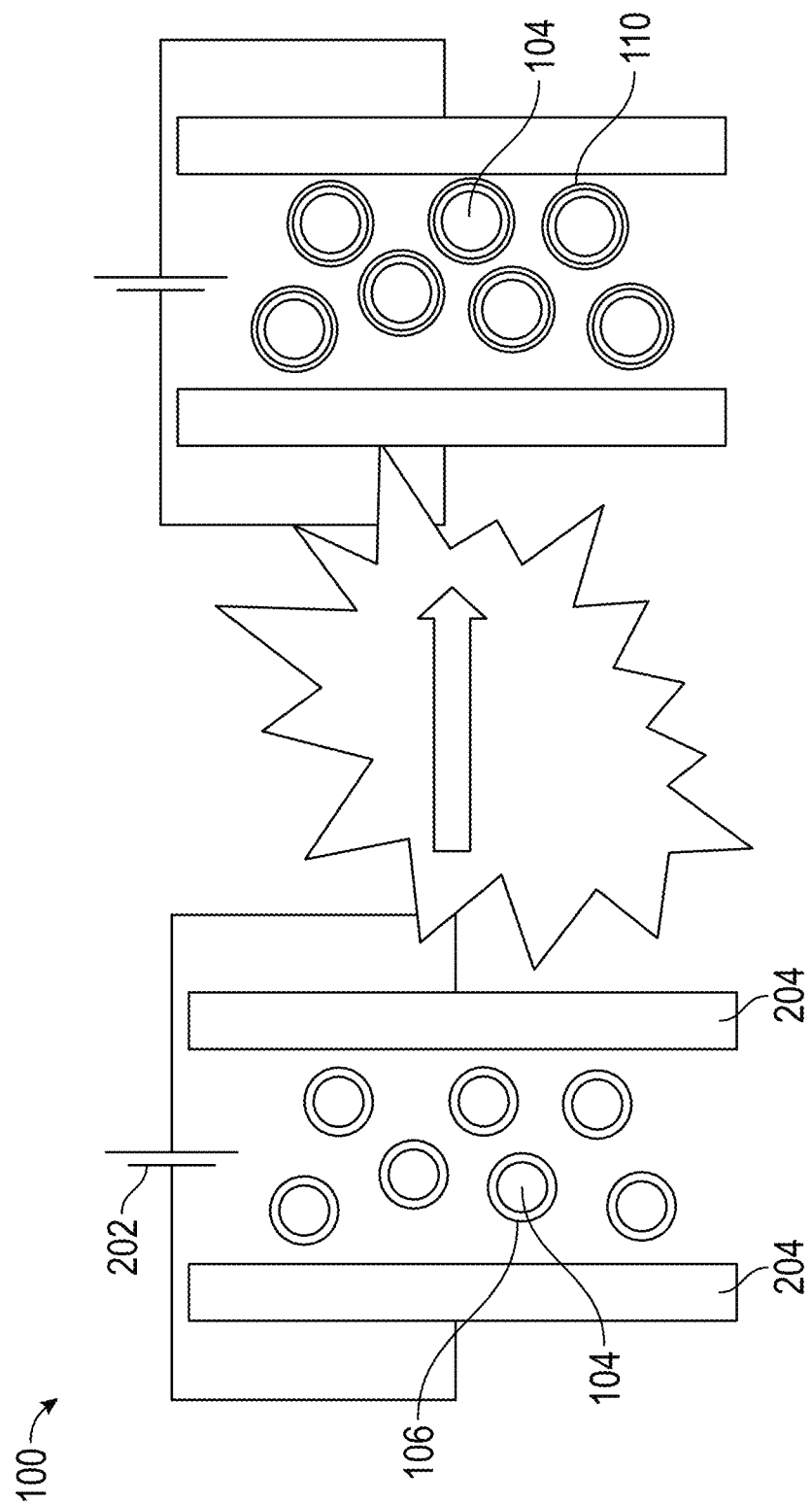
FIG. 1 is an exemplary schematic depiction of a process for producing the graphite coated particles.

The following description is merely exemplary in nature and is not intended to limit the present disclosure, its application or uses. It should be understood that throughout the drawings, corresponding reference numerals indicate like or corresponding parts and features.

Disclosed herein is a method of producing a coating that comprises graphite on electrically active surfaces. The electrically active surfaces may include the surfaces of electroactive particles (also referred to herein as electroactive substrates). The term electroactive particles and electroactive substrates are used interchangeably.

The method comprises applying a carbonaceous material to the surface of an electroactive substrate to form a carbon coated particle that is then converted to a graphite coated particle. In the interest of brevity, the carbon coated particle or surface will hereinafter be referred to as a "carbon coated particle". The carbon coated particle is then disposed between parallel plate electrodes and subjected to a pulsing voltage. The carbon coated particles are placed between the parallel plate electrodes and in contact with the electrodes. The carbon coated particles are also in contact with one another while being disposed between the electrodes. In short, the pulsed voltage induces an electrical current that travels by electrical conductivity from one electrode through the carbon coated particles to the opposing electrode. The current induces a temperature rise via joule heating. The method of instantaneously converting the carbonaceous coating to graphite (thereby producing a graphite layer on the electroactive substrate) is sometimes referred to as "flash graphene synthesis" and is based on local Joule heating at very short time scales (on the order of milliseconds). Upon conversion, the carbon coated particle is referred to as a "graphite coated particle". This method is advantageous because it does not use a furnace and does not use the extremely high temperatures for the extended time periods used in other conventional processes. It can, on the other hand, use a variety of carbon sources and can be a high throughput source for manufacturing electroactive substrates with a graphitic layer disposed thereon.

The coating (on the electroactive substrate) after conversion to graphite may contain some amorphous carbon in addition to graphitic carbon. The ratio of amorphous carbon to graphitic carbon may be adjusted by adjusting the magnitude of the voltage, by adjusting the time period for which the carbon coated particle is subjected to the pulsing voltage, or by adjusting both the magnitude of the voltage as well as the time period for which the carbon coated particle is subjected to the pulsing voltage. This will be discussed in detail later.

Figure 2:
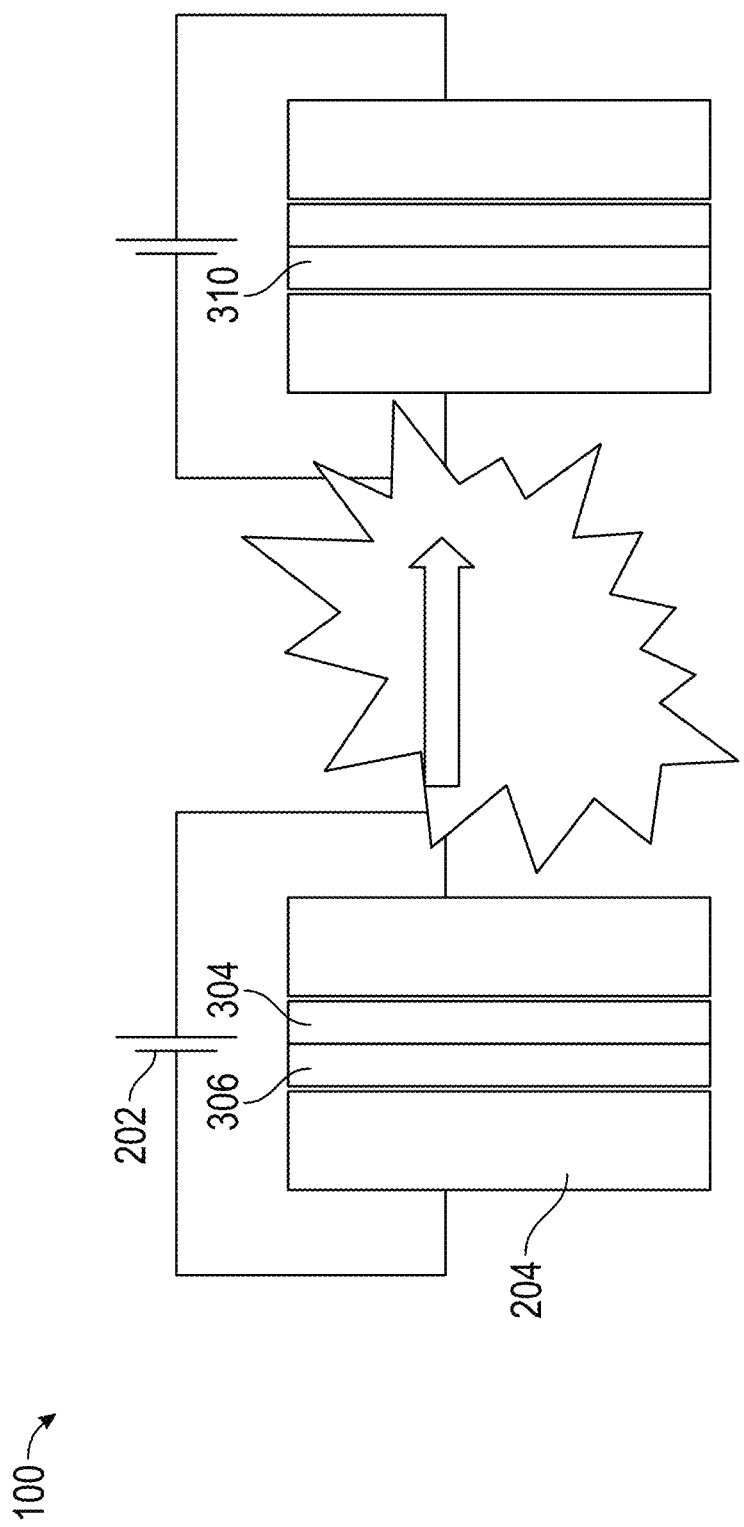
FIG. 2 is an exemplary schematic depiction of a process for producing an electrode that contains the graphite coated particles.

FIGS. 1 and 2 are exemplary schematic depictions of an apparatus 100 that demonstrates the flash graphene synthesis method (as it is used to generate a graphitic layer on an electroactive substrate). In the FIG. 1, the electroactive substrate is portrayed as an electroactive particle 104, while in the FIG. 2, a current collector 304 (that may be subsequently used as an electrode) has disposed on it a particle mixture containing electroactive particles coated with a carbonaceous material (carbon coated particles). The carbon coated particles (from the particle mixture) are converted to graphite coated particles. It is to be noted that in the FIGS. 1 and 2 that other carbonaceous materials used in the particle mixture such as, for example, solvents, binders, and the like may also be converted into graphite when subjected to the pulsed voltage.

With reference to the FIG. 1, the apparatus 100 comprises a voltage source 202 that is in contact with parallel electrodes 204. Disposed between the electrodes 204 are the electroactive particles 104 having a carbonaceous coating 106 disposed thereon (the carbon coated particles). The carbon coated particles may be in the form of a dry or wet particle mixture (this is detailed later). When the carbon coated particles are subjected to a pulsed voltage (as depicted by the arrow), portions of the carbonaceous coating 106 are converted to a graphitic conformal coating 110 (hereinafter graphitic coating 110) to form the graphite coated particles. The pulsed voltage results in local Joule heating at extremely short time scales to convert the carbonaceous coating 106 to a graphitic coating 110. A conformal coating is one that 'conforms' to the contours of a substrate. In this particular instance, the graphitic coating 110 conforms to the contours of the electroactive particles 104 (see FIGS. 1 and 3). The electroactive particles 104 therefore act as substrates upon which is disposed the graphitic coating 110.

With reference to the FIG. 2, the apparatus 100 comprises a voltage source 202 that is in contact with electrodes 204. A current collector 304 with a carbon-containing layer 306 (that comprises the carbon coated particles) is placed between the electrodes 204. The carbon-containing layer 306 is bonded to the current collector 304 prior to graphitization. Upon subjecting the current collector 304 with the carbon-containing layer 306 disposed thereon to the pulsed voltage between parallel plate electrodes 204, the carbonaceous material in the carbon coated particles is converted to graphite. As noted above, any other carbonaceous material used in the particle mixture (e.g., solvents, binders, catalysts, initiators, and the like) may also be converted to graphite. The current collector 304 with the graphitic network layer 310 (of graphite coated particles) may be used as an electrode (e.g., an anode) in another device such as, for example, a battery, a capacitor, or the like. The layer 310 (after graphitization) is not in the form of a powder or particle mixture but is a solid graphitic composite layer (with electroactive substrates dispersed therein) firmly bonded to the current collector 304.

In an embodiment (with reference to the FIG. 1), the entire carbonaceous coating 106 may be converted into a graphitic coating 110. In another embodiment, only a portion of the carbonaceous coating 106 may be converted to a graphitic coating, with the remainder being in the form of amorphous carbon.

In order to manufacture the graphite coated particles, the electroactive substrates have to be first coated with a carbonaceous coating (i.e., the carbon coated particles are first manufactured). This may be done in a mixing device such as for example a ball mill, a Waring blender, a Henschel mixer, an extruder (e.g., single screw or twin screw extruders), roll mills, or the like. The mixing device applies the carbonaceous coating to the electroactive substrate via extensional and shear forces to produce the carbon coated particles. While the mixing may be brought about at elevated temperatures and pressures if desired, ambient temperatures and pressures are often suitable. The carbonaceous material and the electroactive substrates along with optional solvents and binders are first mixed in the mixing device to form a particle mixture that comprises the carbon coated particles. The term "particle mixture" encompasses both dry particle mixtures (mixtures of particles where no liquid is present) and wet particle mixtures (mixtures of particles where a liquid is present). The particle mixture is then placed between the electrodes as shown in FIGS. 1 and 2 and subjected to the pulsed voltage to produce the graphitic coating on the electroactive substrates.

The electroactive substrate may be electrically conducting or semiconducting. In an embodiment, the electroactive substrate may comprise a metal with a metal oxide layer disposed thereon (e.g., silicon with silicon oxide disposed thereon, aluminum with aluminum oxide disposed thereon, or the like). Suitable electroactive substrates include silicon, silicon-containing materials and alloys such as silicon carbide, silicon oxide, silicon nitride, silicon boride, lithium silicide, or the like, or a combination thereof. The silicon may be amorphous, crystalline or polycrystalline prior to being subjected to the pulsed voltage.

Other electroactive materials can include metal or semi-metals that comprise tin, germanium, aluminium, boron, or the like, or a combination thereof.

The electroactive substrates may have various geometrical forms and may be in the form of spherical particles, fibers, rods, whiskers, fibrils (linear or branched), platelets, ellipsoids, cuboids, or the like, or a combination thereof. A preferred geometrical form is a spherical particle. The electroactive particles have an average particle size of 5 nanometers to 100 micrometers, preferably 30 nanometers to 50 micrometers, and more preferably 50 nanometers to 10 micrometers. The average particle size is determined by the radius of gyration of the substrates. The electroactive substrates may have a unimodal or multimodal size distribution. Bimodal size distributions (or greater, such as for example, trimodal size distributions) are preferred because of their superior percolative effects. In an embodiment, the average particle size may be determined by xray or light scattering. For fibrous electroactive particles, the average aspect ratio is greater than 5, preferably greater than 10 and more preferably greater than 50.

As noted above, the particle mixture contains the electroactive substrates, carbonaceous materials and optional solvents or binders. Particle mixtures that do not contain solvents are dry particle mixtures, whereas particle mixtures that contain solvents are wet particle mixtures. When the particle mixture is a wet particle mixture (i.e., contains liquids such as solvents), the electroactive substrates may be present in the particle mixture in an amount of 30 to 70 weight percent (wt %), preferably 35 to 50 wt %, preferably 40 to 48 wt %, based on the total weight of the particle mixture.

When the particle mixture is a dry particle mixture (i.e., contains no liquids), the electroactive substrates may be present in the particle mixture in an amount of 75 to 97 weight percent (wt %), preferably 80 to 93 wt %, based on the total weight of the particle mixture.

Carbonaceous materials that may be used to manufacture the graphitic coating include carbon-containing solids such as, for example carbon black, graphite platelets, coke, soot, polymers, or the like, or a combination thereof; carbon-containing fluids (both liquids and gases at room temperature) such as, for example, carbon monoxide, carbon dioxide; aliphatic hydrocarbons such as, for example, alkanes (e.g., methane, ethane, pentane, hexane, decane, dodecane, or the like, or a combination thereof); alkynes (e.g., ethylene, propylene, acetylene, or the like, or a combination thereof); alcohols (e.g., methanol, ethanol, butanol, propanol, ethylene glycol, or the like, or a combination thereof); aromatic hydrocarbons (e.g., benzene, toluene, xylene, cumene, ethylbenzene, naphthalene, phenanthrene, anthracene, or the like, or a combination thereof); or a combination thereof. Oxygen-containing hydrocarbons may also be used for generating the graphitic layer. Suitable examples of oxygen-containing hydrocarbons include formaldehyde, acetaldehyde, acetone, methanol, or ethanol or mixtures thereof; and include carbon monoxide and carbon dioxide. As may be noted from the list of carbonaceous materials above, the conversion from a carbonaceous material to a graphitic layer using the pulsed voltage may be conducted in the gas phase or in the liquid phase.

Polymers may be used as carbon-containing solids to coat the electroactive substrates. Polymers may also be used as a binder when other carbon-containing materials (e.g., carbon black, coke, and the like) are used to form the carbonaceous coating. The binder when subjected to pulsed voltages will decompose to form a part of the graphitic coating with the remainder of the graphitic coating being formed by the other carbon-containing materials that are encapsulated by the binder. Polymers with lower degradation temperatures are preferred for use as binders. Catalysts and initiators that facilitate degradation and decomposition may also be used in the particle mixture.

Examples of polymers that may be used as carbon-containing solids include a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination comprising at last one of the foregoing organic polymers. The organic polymers have number average molecular weights greater than 10,000 grams per mole, preferably greater than 20,000 g/mole and more preferably greater than 50,000 g/mole.

Examples of thermoplastic polymers include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyguinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, poly sulfonamides, polyureas, polyphosphazenes, polysilazanes, polypropylenes, polyethylenes, polyethylene terephthalates, polyvinylidene fluorides, polysiloxanes, or the like, or a combination thereof.

Examples of polyelectrolytes are polystyrene sulfonic acid, polyacrylic acid, pectin, carrageenan, alginates, carboxymethylcellulose, polyvinylpyrrolidone, or the like, or a combination thereof.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination thereof.

Other naturally occurring carbon-containing materials may also be used to produce the graphite layer. Examples of naturally occurring materials are cellulose (e.g., methyl cellulose, ethyl cellulose, hydroxymethyl cellulose, hydroxyethyl cellulose, coffee grounds, rice hulls, crushed walnut shells, husk, or the like, or a combination thereof. The naturally occurring materials should be crushed before being dispersed into the particle mixture. The use of naturally occurring materials renders the materials and the methods used (to make the graphite coated particles) environmentally sustainable.

For dry particle mixtures it is desirable to have the carbonaceous particles be as small as possible so that they can bind electrostatically to the electroactive particles.

When the particle mixture is a wet particle mixture (i.e., contains a solvent), the carbonaceous materials may be present in the particle mixture in an amount of 1 to 10 weight percent (wt %), preferably 2 to 5 wt %, based on the total weight of the particle mixture. When the particle mixture is a dry particle mixture (i.e., contains no solvent), the carbonaceous materials may be present in the particle mixture in an amount of 3 to 25 weight percent (wt %), preferably 7 to 20 wt %, based on the total weight of the particle mixture.

Solvents may optionally be used to effect the disposing of the carbon-containing material onto the electroactive substrate. In an embodiment, a solvent in conjunction with a co-solvent (that can dissolve the polymer at elevated temperatures) may be used. The solvent may be removed (by vacuum) after the coating of the carbonaceous material on the electroactive substrate (i.e., the particle mixture may be a dry particle mixture). Alternatively, the solvent may be left in the particle mixture (i.e., the particle mixture may be a wet particle mixture) and undergoes graphitization during the application of the pulsed voltage.

The solvents may be liquid aprotic polar solvents, polar protic solvents, non-polar solvents, or combinations thereof. The solvent may be selected depending upon the type of electroactive substrate used, the type of the carbonaceous material used, or both. It is desirable for the solvent to dissolve a portion of any polymeric carbonaceous material that may be used for coating the electroactive substrate. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or a combination thereof. Polar protic solvents such as, water, methanol, acetonitrile, nitromethane, ethanol, propanol, isopropanol, butanol, or the like, or combinations thereof may be used. Other non-polar solvents such a benzene, toluene, methylene chloride, carbon tetrachloride, hexane, diethyl ether, tetrahydrofuran, or the like, or combinations thereof may also be used. Examples of preferred solvents are water, alcohols, tetrahydrofuran, acetone, or combinations thereof.

The solvent, if used, may be present in an amount of 25 to 69 wt %, 40 to 65 wt %, preferably 50 to 60 wt %, based on the total weight of the particle mixture.

After the preparation of the particle mixture, it is placed between the two electrodes to undergo graphitization via the application of a pulsed voltage. The preparation of the particle mixture and the subsequent graphitization step may be conducted in a batch process or in a continuous process. Embodiments of the batch and continuous processes are detailed below. The general graphitization process (using pulsed voltages) for producing the graphite coated electroactive substrates will first be detailed.

The particle mixture containing the electroactive substrates with a carbonaceous layer disposed thereon may be disposed between a pair of electrodes (parallel plate electrodes) as shown in the FIGS. 1 and 2. The parallel plate electrodes comprise a refractory material such as copper, graphite or tungsten. The particle mixture is subjected to a pulsed voltage of 10 to over 200 volts, preferably 30 to 75 volts and more preferably 60 to 150 volts, for a time period of 0.5 milliseconds to 10 minutes. The pulsing may be conducted using multiple pulse voltages for multiple pulse durations applied for multiple time periods. For example, a first pulsed voltage of 140 volts for a first pulse duration of 5 milliseconds may be applied for a first time period of 1 minute followed by the application of a second pulsed voltage of 130 volts for a second pulse duration of 5 milliseconds applied for a second time period of 5 minutes.

The application of the pulsed voltage results in flash graphitization of the carbonaceous material due to a local temperature spike between the parallel plate electrodes. High voltages create local heating at very short time scales (e.g., less than 10 milliseconds). Upon cooling, the carbon transitions to the lowest energy structure, which is graphite. Graphite comprises a plurality of graphene sheets.

Pulse intensity (voltage) and pulse duration dictate the degree of heating which can be controlled to optimize the degree of graphitization in carbon coating and also to prevent damage to the electroactive substrates (e.g., silicon particles) (See FIG. 1) or to current collectors (See FIG. 2). Carbon generally undergoes graphitization at temperatures of about 1000° C. or greater.

Each voltage pulse is on the order of milliseconds. A preferred time interval for each pulse is 5 to 50 milliseconds, preferably 7 to 30 milliseconds, and more preferably 10 to 20 milliseconds. It is to be noted that the voltage and time period (the total time for which the particle mixture lies between the electrodes, which should not be confused with pulse duration) are inversely related to each other. In other words, graphitization may be achieved by using a higher voltage for a shorter period of time, or alternatively, it may be achieved by using a lower voltage for a longer period of time. Longer time periods at a given voltage generally result in greater conversion of the carbonaceous material into graphite. By retaining the particle mixture for a longer period of time between the electrodes it is possible to convert all of the carbonaceous material into graphite. When all of the carbonaceous material is converted into graphite, there is substantially no amorphous carbon between the electroactive substrate and the graphite layer.

Figure 3:
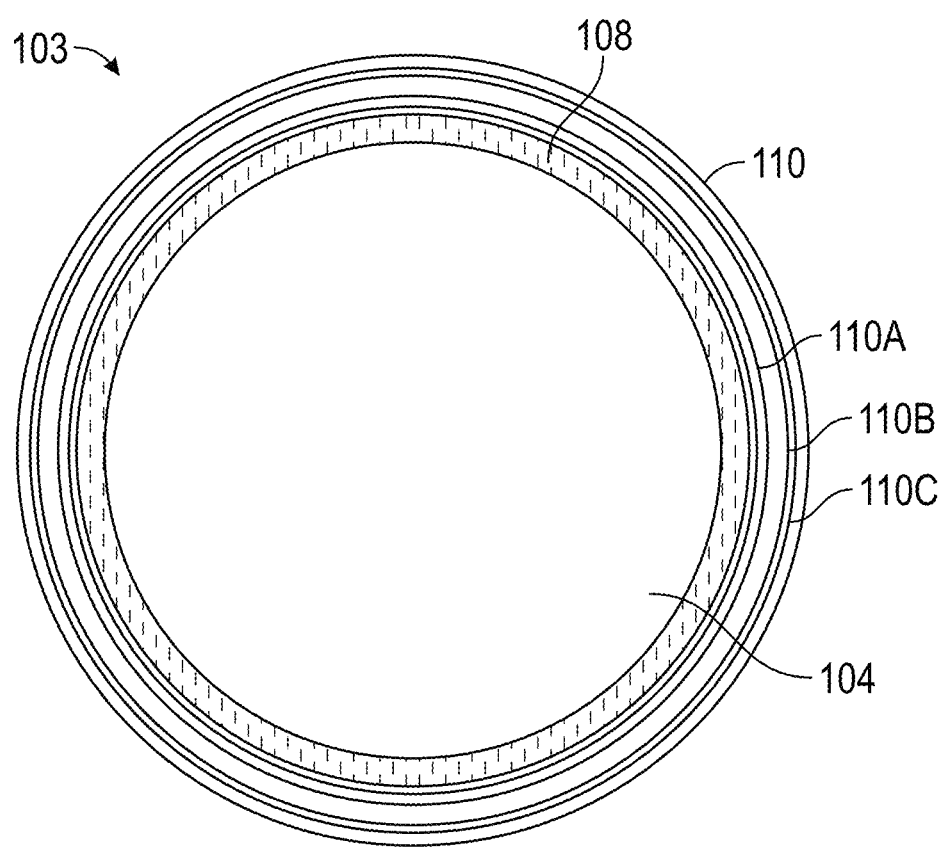
FIG. 3 is an exemplary depiction of the graphite coated particle.

The resulting graphite coated particle preferably contains at least one layer of graphene disposed on the electroactive substrate. Graphene refers to a single flat sheet of carbon atoms arranged in a repeating hexagonal lattice. Graphite comprises a plurality of graphene sheets stacked atop one another. FIG. 3 is a schematic exemplary depiction of a graphite coated particle 103 that comprises the electroactive substrate 104 upon which is disposed an optional amorphous carbon layer 108 and the graphitic layer 110. The graphitic layer preferably comprises at least one layer of graphene that partially or completely encapsulates the electroactive substrate. In the FIG. 3, the graphitic particle is shown as having 3 graphene layers—110A, 110B and 110C, which are parallel to each other. The d-spacing between graphene layers may be 0.34 nanometers or greater. The graphite layer generally has a thickness of 0.34 nanometer to 100 nanometers, preferably 1 nanometer to 15 nanometers, and more preferably 3 nanometers to 10 nanometers.

In an embodiment, the graphitic layer 110 preferably comprises at least 3 or more layers of graphene, preferably 10 or more layers of graphene, and more preferably 15 or more layers of graphene that partially or completely encapsulate the electroactive substrate. In a preferred embodiment, the graphitic layer preferably completely encapsulates the electroactive substrate.

In an embodiment, the graphitic layer preferably completely encapsulates the amorphous layer, which in turn encapsulates the electroactive substrate. In another embodiment, the amorphous layer encapsulates the graphitic layer, which in turn encapsulates the electroactive substrate.

The graphitic layer may be disposed directly on a surface of the electroactive substrate. The amorphous layer is an optional layer whose thickness can be varied by being subjected to extended pulsing voltages or some other form of thermal treatment.

In an embodiment, the graphitic layer is disposed on an outer surface of the amorphous layer and has a greater average radius than the amorphous layer. In an embodiment, the amorphous layer contacts the electroactive substrate, while the graphitic layer contacts the amorphous layer. The layers of graphene are conformal layers and generally have a shape that is similar to the shape of the surface that they are in contact with. The layers of graphene are substantially parallel to an outer surface of the amorphous layer or to an outer surface of the electroactive substrate.

The thickness of the amorphous layer vary in an amount of 0% to over 200%, preferably 2% to over 100%, and more preferably 5% to over 50%, of the thickness of the graphitic layer. The graphitic layer is generally more electrically conducting than the amorphous layer and is also more electrically conducting than the electroactive substrate. In an embodiment, the graphitic layer is more electrically conducting than the amorphous layer, which is in turn more electrically conducting than the electroactive substrate. In another embodiment, the graphitic layer is more electrically conducting than the electroactive substrate, which is in turn more electrically conducting than the amorphous layer.

The preparation of the graphite coated particles from the carbon coated particles may be conducted in a batch process or in a continuous process.

In a batch process, the particle mixture is first manufactured in a mixing device. The electroactive particles, the carbonaceous material, optional solvents and binders are added to the mixing device and subjected to agitation to produce a particle mixture that contains a coating of the carbonaceous material disposed on the electroactive substrate (i.e., produce the carbon coated particle). The particle mixture may then be stored on a shelf for future use, or alternatively be transferred to the apparatus of FIG. 1 or 2 to be subjected to the pulsed voltage to produce the graphitic coating on the electroactive substrate (i.e., produce the graphite coated particles). The device for applying the pulsed voltage lies downstream of the mixing device.

In a continuous process the particle mixture is in motion during the application of the pulsed voltage. The particle mixture is transported through the parallel plate device (which is located on the opposing faces of a conduit) during the application of the pulsed voltage (see FIG. 4). The particle mixture may be transported via a travelling current collector (see FIG. 5). In both FIG. 4 and FIG. 5, the conversion to graphite occurs while the carbonaceous material is in motion (i.e., is being transported). These processes may therefore be referred to as dynamic graphitization processes.

Figure 4:
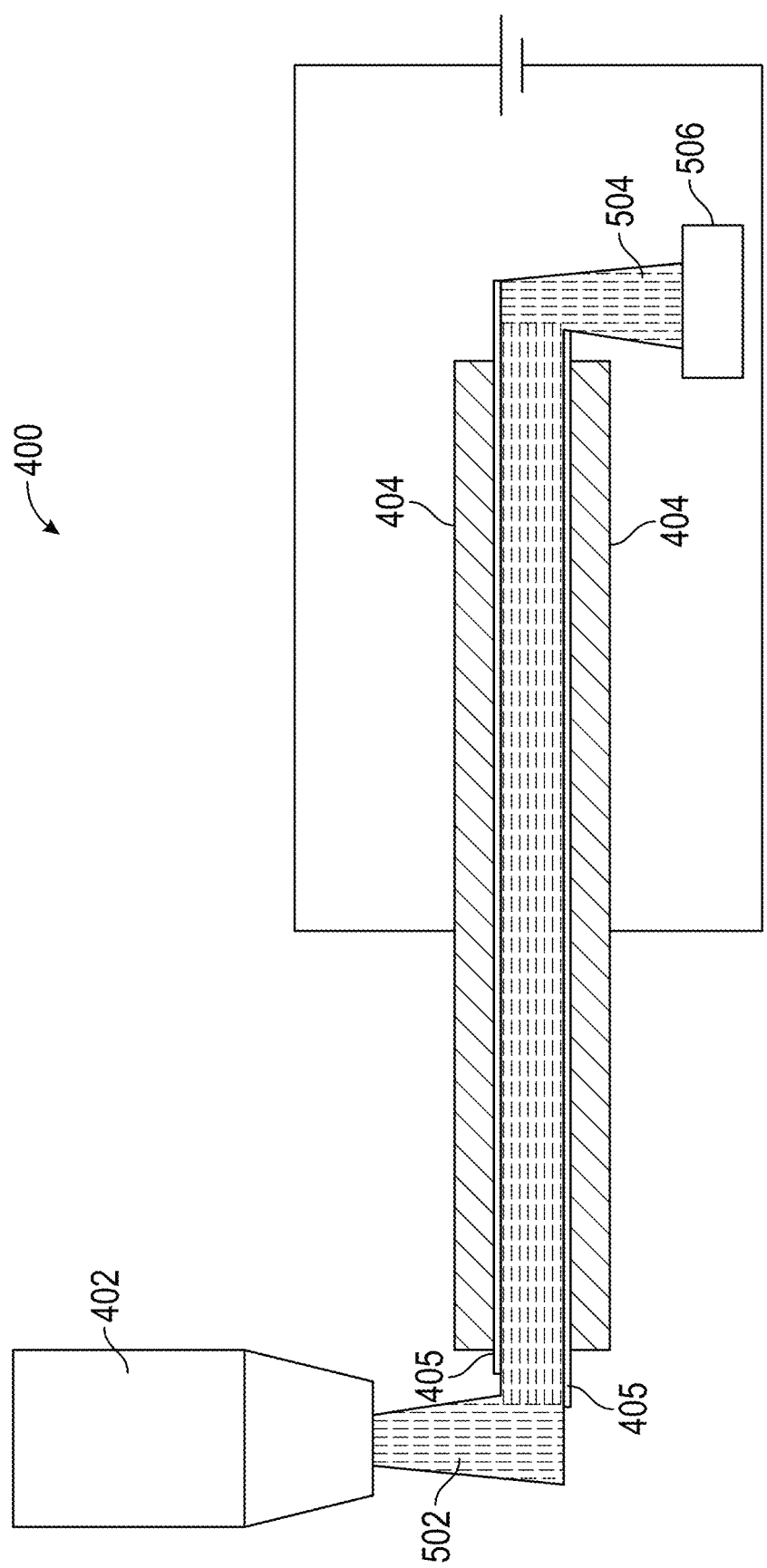
FIG. 4 is an exemplary schematic depiction of a continuous process for producing the graphite coated particles.

In a continuous process, the particle mixture is manufactured in the mixing device and is directly transferred to an apparatus that continuously subjects a stream of particle mixture to the pulsed voltage to graphitize the carbonaceous coating. FIG. 4 represents one exemplary embodiment of such a continuous manufacturing process. The apparatus 400 comprises a mixing device 402 that produces the carbon coated particles in the form of particle mixture 502. The mixing devices may be selected from the list detailed above. Ball mills are preferred for performing the mixing. The particle mixture 502 is then discharged into a channel 405 (that lies downstream of the mixing device 402) that contains the parallel electrodes 404.

In an embodiment, the particle mixture 502 may be pumped via a pump (not shown) from the mixing device 402 into the conduit 405. In an alternative embodiment, the particle mixture 502 may be transported via gravity (by virtue of a hydrostatic head). Combinations of hydrostatic head and pumping may be used to transport the particle mixture through the electric field where it is subjected to the pulsed voltage. The parallel electrodes 404 are disposed on opposing faces of the conduit 405 and are in communication with a voltage source 403. As the particle mixture travels through the conduit a pulsed voltage is applied to it via the parallel electrodes 404 resulting in the conversion of the carbonaceous material into graphite. The conduit may have a square, rectangular or circular cross-sectional area among others. When the cross-sectional area of the conduit is circular, the opposing electrodes may be disposed across from each other in the conduit and may have curved surfaces. The electroactive substrates with the graphitic layer disposed thereon 504 are then discharged into a collector 506 for further downstream use.

Figure 5:
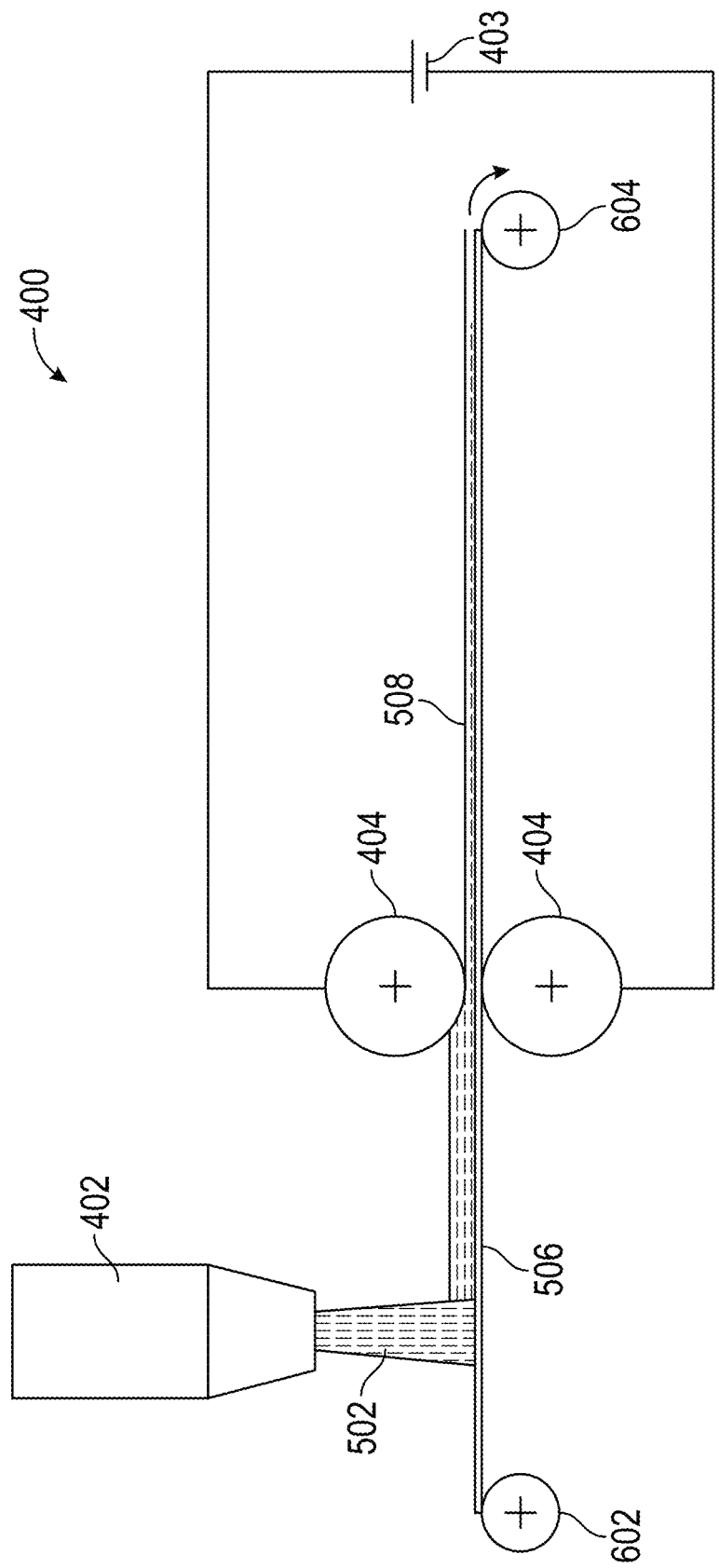
FIG. 5 is an exemplary schematic depiction of a continuous process for producing the electrode that contains the graphite coated particles.

FIG. 5 depicts a continuous method for producing the electrode shown previously in the FIG. 2. In this method, the current collector is transported through the electric field with the particle mixture (comprising carbon coated particles) disposed on the current collector. The current collector may be unwound from one spool, and after being subjected to the pulsed voltage with the carbon coated particles (which are converted to graphite coated particles upon being subjected to the pulsed voltage) disposed thereon, is wound onto another spool. The pulsed voltage is applied via rolls on a roll mill.

With reference to the FIG. 5, the apparatus 400 comprises a mixing device 402 that mixes the electroactive substrates and the carbonaceous materials along with optional solvents and binders to form the particle mixture 502. The mixing devices may be selected from the list detailed above. Ball mills are preferred for performing the mixing. The particle mixture 502 is then discharged into onto a sheet of current collector 506. The sheet of the current collector lies downstream of the mixing device. The sheet of the current collector is unwound from one spool 602. During its travel to the next spool 604 (onto which it is rewound) the particle mixture is disposed on it. The particle mixture 502 along with the current collector sheet 506 is subjected to a pulsed voltage prior to contacting the spool 604. In an embodiment, the particle mixture 502 may be pumped via a pump (not shown) from the mixing device 402 onto the current collector sheet 506. The parallel electrodes 404 (in the form of a roll mill that are located downstream of the mixing device) are disposed on opposing sides of the current collector sheet 506, with the respective rolls being in communication with a voltage source 403. As the particle mixture (disposed on the current collector sheet 506) travels through the rolls (of the roll mill) a pulsed voltage is applied to it resulting in the conversion of the carbonaceous material into graphite. The opposing rolls of the roll mill are used to apply the pulsed voltage. The conversion to graphite thus occurs while the carbonaceous material is in motion. The elongational and shear forces applied by the rolls to the particle mixture also facilitate adhesion between the graphitized material and the current collector to form an electrode. The roll mills may also be used to calendar the electrode during the formation of the anode. The electrode may be cut into smaller sections (not shown) for further downstream use.

The methods for graphitizing the carbonaceous material disclosed above are advantageous over currently used methods because they operate at elevated temperatures for shorter periods of time thereby preventing damage to the electroactive substrates. The method also does not use expensive graphene additions during the mixing process. The method is environmentally friendly and cost effective compared with existing processes.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
   mixing an electroactive particle with a non-conductive carbonaceous material to form a particle mixture that comprises a coated particle comprising the electroactive particle having a coating consisting of the carbonaceous material;
   subjecting the coated particle to a pulsed voltage between parallel plate electrodes or between rolls of a roll mill to convert the coated particle to a graphite coated particle via localized Joule heating.

2. The method of claim 1, where the pulsed voltage is 10 to 200 volts.

3. The method of claim 1, where the pulsed voltage has a pulse duration of 5 to 50 milliseconds.

4. The method of claim 1, where the particle mixture further comprises a solvent.

5. The method of claim 1, where the parallel plate electrodes comprise a refractory material.

6. The method of claim 5, where the refractive material is copper, graphite or tungsten.

7. The method of claim 1, where the graphite coated particle comprises an amorphous layer and a graphite layer.

8. The method of claim 7, where the amorphous layer is disposed between the electroactive particle and the graphite layer.

9. The method of claim 1, where the graphite coated particle comprises only a graphite layer disposed on the electroactive particle.

10. The method of claim 1, further comprising transporting the particle mixture while applying the pulsed voltage to the particle mixture.

11. The method of claim 1, further comprising discharging the particle mixture from a mixing device to the parallel plate electrode.

12. The method of claim 1 wherein the carbonaceous material is selected from the group consisting of polymers, carbon containing gases, aliphatic or aromatic hydrocarbons with or without oxygen atoms, organic polymers or combinations thereof.

13. A method comprising:
    mixing an electroactive particle with a carbonaceous material to form a particle mixture that comprises a carbon coated particle;
    subjecting the carbon coated particle to a pulsed voltage between parallel plate electrodes or between rolls of a roll mill; and
    converting the carbon coated particle to a graphite coated particle via localized Joule heating where the particle mixture is discharged from a mixing device to a moving sheet which is a current collector.

* * * * *